US012727690B1

(12) United States Patent
Bavli et al.

(10) Patent No.: US 12,727,690 B1
(45) Date of Patent: Sep. 8, 2026

(54) PORTABLE TRAVEL MAT HAVING DIFFERENT CONFIGURATIONS FOR USE AS A PILLOW OR CUSHION FOR COMFORT

(71) Applicants: Guy Bavli, Davie, FL (US); Tal Bavli Weissman, Davie, FL (US)

(72) Inventors: Guy Bavli, Davie, FL (US); Tal Bavli Weissman, Davie, FL (US)

( * ) Notice: Subject to any disclaimer, the term of this patent is extended or adjusted under 35 U.S.C. 154(b) by 45 days.

(21) Appl. No.: 18/741,395

(22) Filed: Jun. 12, 2024

Related U.S. Application Data

(60) Provisional application No. 63/472,408, filed on Jun. 12, 2023.

(51) Int. Cl.

| | |
|---|---|
| ***A47G 9/06*** | (2006.01) |
| ***A47G 9/10*** | (2006.01) |
| ***B64D 11/06*** | (2006.01) |

(52) U.S. Cl.
CPC ........... *A47G 9/062* (2013.01); *A47G 9/1045* (2013.01); *B64D 11/0647* (2014.12); *A47G 2009/1018* (2013.01)

(58) Field of Classification Search
CPC .......... A47G 9/06; A47G 9/062; A47G 9/064; A47G 9/066
USPC .............................................................. 5/420
See application file for complete search history.

(56) References Cited

U.S. PATENT DOCUMENTS

| | | | | |
|---|---|---|---|---|
| 5,843,556 | A * | 12/1998 | Levas .................... | A47C 31/11 5/419 |
| 7,017,206 | B1 * | 3/2006 | Kedineoglu .............. | A45F 4/02 5/420 |
| 7,076,816 | B1 * | 7/2006 | Nielsen .................. | A47G 9/062 383/4 |
| 9,295,337 | B1 | 3/2016 | Bavli | |
| 2005/0005361 | A1 * | 1/2005 | Conforti .............. | A47D 15/003 5/655 |
| 2016/0287928 | A1 * | 10/2016 | Darnell .............. | A63B 21/4037 |
| 2018/0317673 | A1 * | 11/2018 | Genao .................. | A47G 9/1045 |
| 2021/0401180 | A1 * | 12/2021 | Pierce .................... | A47C 7/386 |
| 2023/0329460 | A1 * | 10/2023 | Fenner ................. | A47G 9/0223 |
| 2024/0298821 | A1 * | 9/2024 | Watkins, Jr. ......... | A47G 9/0215 |

* cited by examiner

*Primary Examiner* — Jason D Shanske
(74) *Attorney, Agent, or Firm* — Mark D. Bowen, Esq.; Malin Haley DiMaggio & Bowen, P.A.

(57) ABSTRACT

A portable travel mat that includes a pliable foam body having an elongated rectangular shape with a fabric cover. The peripheral edges around four sides of the rectangular-shaped travel mattress include a fabric element attached peripherally to the fabric pad cover and containing two layers of glued together foam, and a firm but bendable cable sandwiched between the two layers of foam, whereby the travel mattress can be manually shaped into multiple configurations by manually bending the bendable cable around the travel mattress into desired shapes, providing a pillow or cushion shape, comfortable for travel, especially on aircraft seats, by a user. A cover pocket affixed to the rear side of the travel mat functions to maintain the travel mat is a rolled up configuration for storage and transport, while further functioning to affix the travel mat to chairs and other apparatus.

5 Claims, 12 Drawing Sheets

PORTABLE TRAVEL MAT HAVING DIFFERENT CONFIGURATIONS FOR USE AS A PILLOW OR CUSHION FOR COMFORT

CROSS REFERENCE TO RELATED APPLICATIONS

This application claims the benefit of provisional U.S. Patent Application Ser. No. 63/472,408, filed on Jun. 12, 2023, the entirety of which is incorporated herein by reference.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

This invention relates to a portable travel foam-filled mat, with a firm but bendable peripheral metal cable or rod member, that can be manipulated manually from its peripheral design shape, into a plurality of specific, different, individual configurations, for uses as a pillow or cushion, especially for sitting, for comfort enhancement. The device can provide support and comfort in seating of any kind, including aircraft, trains, office, automobile, and other seating venues. The travel mat may be used as a yoga exercise mat, head rest, and for supporting the back, neck, and body, during rest and sleep in a chair or seat.

2. Description of Related Art

Long-distance air travel today is commonplace throughout the world in this global economy and environment. Traveling for hours on an aircraft in a cramped small space is commonplace. Long rides on other means of transportation are also common including on cars, buses, and trains. Most of the seats available in public transportation, and especially economy class, provide such a cramped environment that it is very difficult to get comfortable, especially for long periods of time. Public transportation seats are often made to be durable and not as soft or comfortable as the public would like them to be, especially for long trips. Individuals vary in comfort and orthopedic needs. The device described herein can be adjusted to support a plurality of different individuals with special needs. Applicant's invention described in U.S. Pat. No. 9,295,337 (the contents of which are incorporated herein by reference) describes a portable travel mat that uses a plurality of fasteners to achieve multiple configurations of the mat structure for different uses as a pillow and cushion for comfort.

The present invention is an improvement that provides a single, manually manipulated, firm but bendable, peripheral metal cable member in a travel mattress, for different mattress configurations, reducing the cost of construction and increasing the usability for the individual in operating the device and achieving different configurations for comfort.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

A portable travel mattress or mat (hereinafter often referred to as "travel mat") having a pliable foam body, with a fabric cover, and a firm, but bendable, metal cable peripheral member, surrounded by foam, that allows the user to manually-shape the travel mat into multiple shapes for comfort.

The travel mat is especially useful for user comfort, when a user is sitting in an airplane seat, train seat, or an office chair. In some embodiments, in a rectangular shape, the travel mat exterior 4 sides, e.g., peripheral top, bottom, and two opposing parallel sides surrounding the rectangular travel mat. The peripheral sides contain a firm, but bendable, metal cable or rod, mounted within two layers of glued-together foam, that permits the travel mat to be manually shaped, in a plurality of different individual configurations, allowing the travel mat's use as a cushion and pillow, in a plurality of different environments, including an airplane seat, a train seat or bus seat or an office chair.

The travel mat includes an attached cover encompassing pocket, for partial or total covered roll up, with two overlapping sides and an opening, for holding and hand carrying. The travel mat is lightweight for travel, and can be manually rolled up into two different configurations, and carried easily, when traveling.

The travel mat structure includes pliable foam that can be memory foam, latex or a combination body with a pliable fabric cloth cover to enclose the foam body. In some embodiments, when rectangular, the travel mat has four peripheral, cylindrical foam-filled walls, that include a firm but bendable metal electrical cable or rod, preferably made of coated hard copper. In some embodiments, an copper electric cable with a 2 mm in diameter is used. The copper electric cable is firm enough to maintain a specific configuration for use for comfort, but is sufficiently bendable manually by a user, to alter the configuration in a variety of different shapes, of the mat periphery, depending on the specific comfort use desired.

The portable travel mat can be packed in an attached two-sided cover pocket, with a central opening between overlapping sides. This attached cover pocket permits partial or complete covering, by rollup, of the travel mat. The attached cover pocket central opening can receive the hand and arm of a user to grasp or attach the travel mat for transport.

The travel mat has a plurality of different folding options, for use on a seat or chair, that is shown and described herein below, to allow manually shaping portions of the travel mat for location of individual comfort on a seat or chair. The travel mat can be used on the upright back and the seat of an office chair and bent accordingly to provide comfort throughout the back area and/or in the seating area as desired. Portions of the travel mat can be rolled up for user extra cushioned support in the back area of the user, while seated. The travel mat can also be used completely extended in all directions as a rectangular floor mat for resting or yoga. In some embodiments, the travel mat can have fabric cover areas with a nonskid material disposed on certain sections to prevent movement of the travel mat on a floor.

It Is an object of this invention to provide a portable mat that can be manually configured into different shapes for use as a cushion, pillow, or body support, especially in a chair and seat, such as found on aircraft, trains or in an office chair, in which a bendable metal cable or rod is used in the travel mat periphery to allow for substantial different shapes of the travel mat.

These and other objects are met by the present invention which will become more apparent from the accompanying drawing and the following detailed description of the drawings and preferred embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word “connected” is used. By “connected” is meant that the article or structure referred to is joined, either directly, or indirectly, to another article or structure. “Indirectly joined” means that there may be an intervening article or structure imposed between the two articles which are “connected”. “Directly joined” means that the two articles or structures are in contact with one another or are essentially continuous with one another. By adjacent to a structure is meant that the location is near the identified structure.

Also, as used in the specification including the appended claims, the singular forms “a,” “an,” and “the” include the plural, and reference to a particular numerical value includes at least that particular value, unless the context clearly dictates otherwise. Ranges may be expressed herein as from “about” or “approximately” one particular value and/or to “about” or “approximately” another particular value. When such a range is expressed, another embodiment includes from the one particular value and/or to the other particular value. Similarly, when values are expressed as approximations, by use of the antecedent “about,” it will be understood that the particular value forms another embodiment.

“Exemplary” may be used herein to mean “serving as an example, instance, or illustration.” Any aspect described in this document as “exemplary” may not necessarily be construed as preferred or advantageous over other aspects.

Turning now to the drawings, FIGS. 1-20 depict a portable travel mat, generally referenced as 10, in accordance with the present invention. Travel mat 10 comprises a portable travel mat that can be used as a pillow, cushion, back-rest in a chair, or comfortable place on many sitting environments, including an aircraft seat, a bus or train seat, automobile back seat, or office or home chair.

Figure 1:
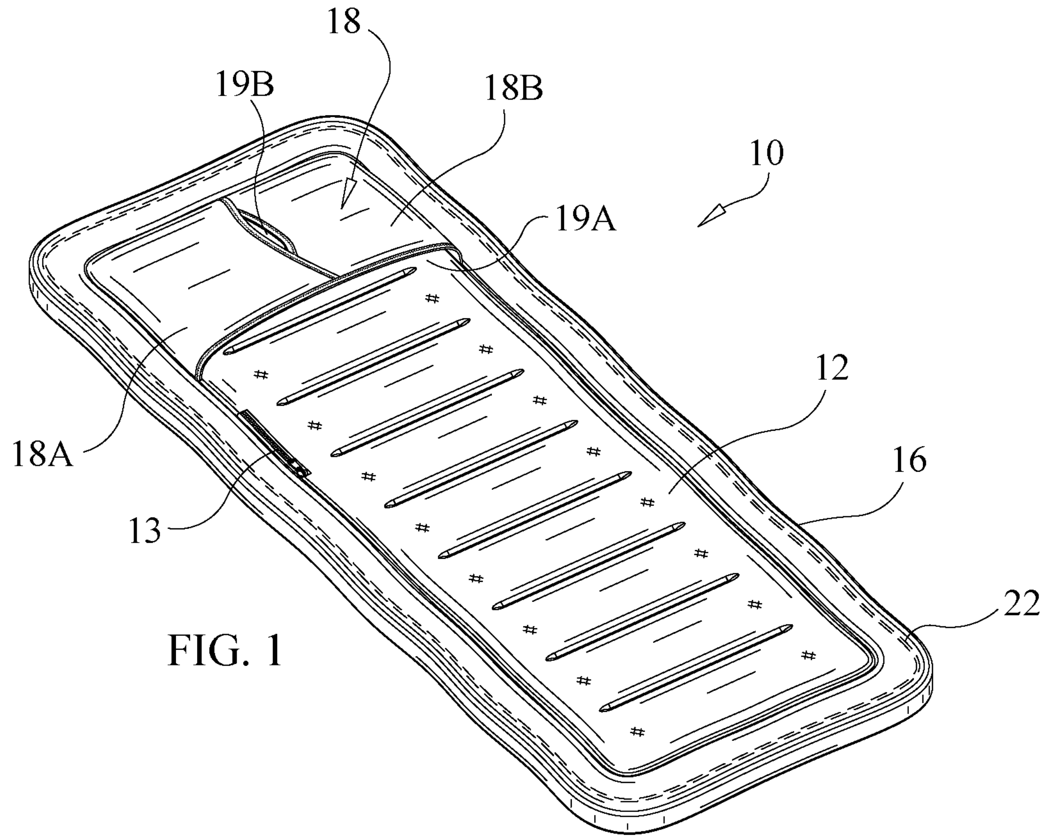
FIG. 1 is a rear perspective view of a portable travel mat in accordance with the present invention.
Figure 2:
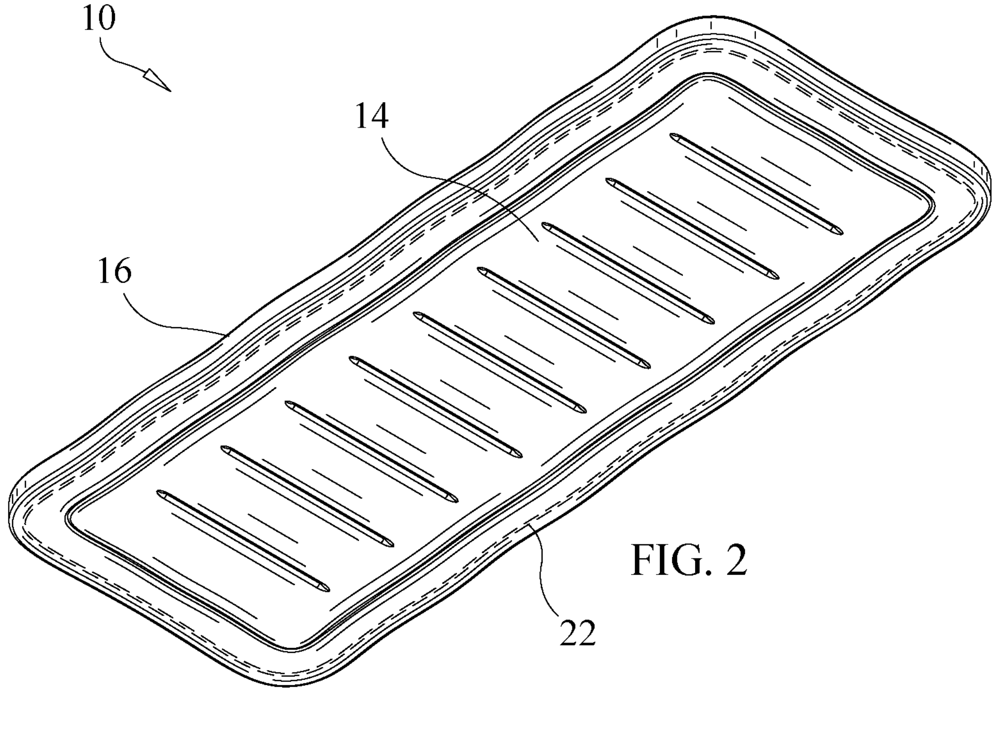
FIG. 2 is a front perspective view thereof.
Figure 3:
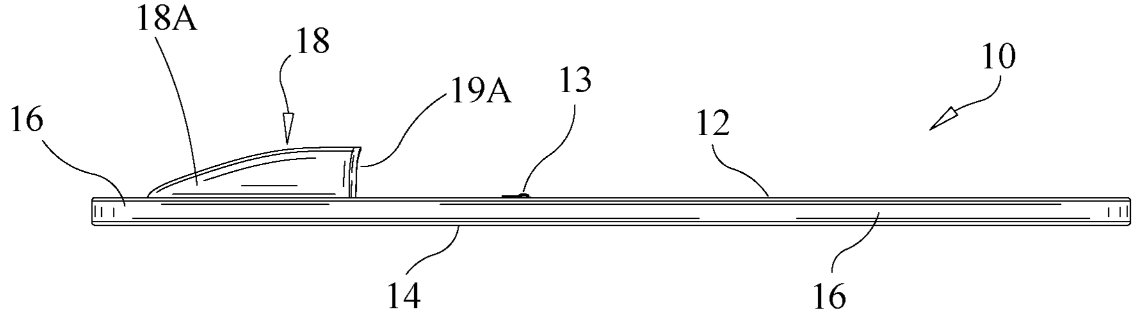
FIG. 3 is a side view thereof.

FIG. 1 is a rear perspective view of travel mat 10 completely stretched out flat as it would appear lying on the floor as a mat and FIG. 2 is a front perspective view thereof. Travel mat 10 includes a main body having a rear side 12, a front side 14, and a peripheral edge 16 disposed in surrounding relation with said main body. In one embodiment, travel mat 10 is generally rectangular in shape having four peripheral sides. Travel mat 10 is comprised of a foam interior and a fabric mat cover exterior on all sides. Internal foam material options including polyurethane foam, Visco foam, and lamination foam for the interior of the travel mattress. The rear side 12 may be covered with a rubber like anti-slip material. As seen in FIG. 1, travel mat 10 further includes a built-in storage compartment or pocket accessed by a zippered closure 13 disposed on the rear side thereof.

Figure 15:
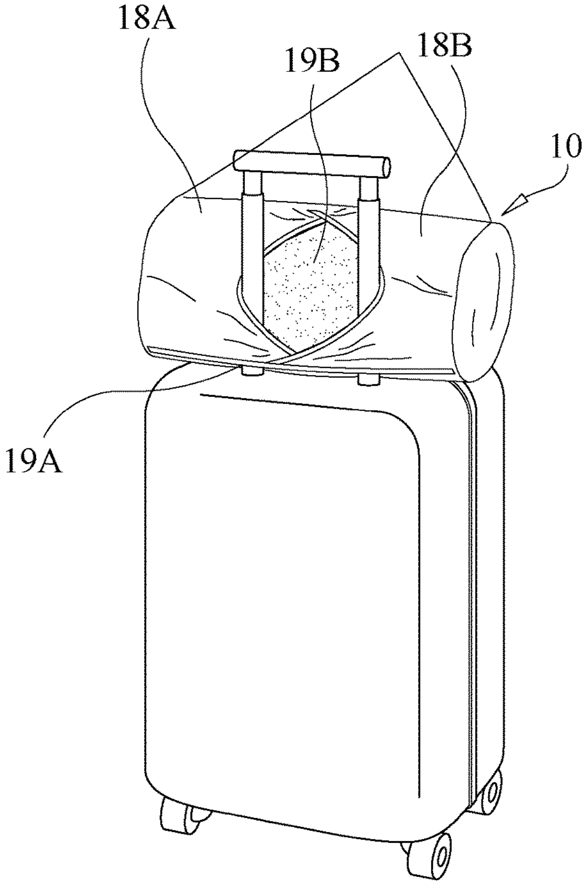
FIG. 15 depicts the portable travel mat in a rolled-up configuration carried by a rolling suitcase.

A cover pocket, generally referenced as 18, is attached to the rear side 12 of mat 10. Cover pocket 18 provides various functions including maintaining travel mat 10 in a rolled configuration as illustrated in FIG. 15. The cover pocket 18 is stretchable whereby cover pocket expands to accept a rolled-up portion of the travel mat 10 in either direction, namely rolled in a first configuration wherein the front of the mat is exposed or in a second rolled configuration wherein the rear of the mat is exposed.

Figure 16:
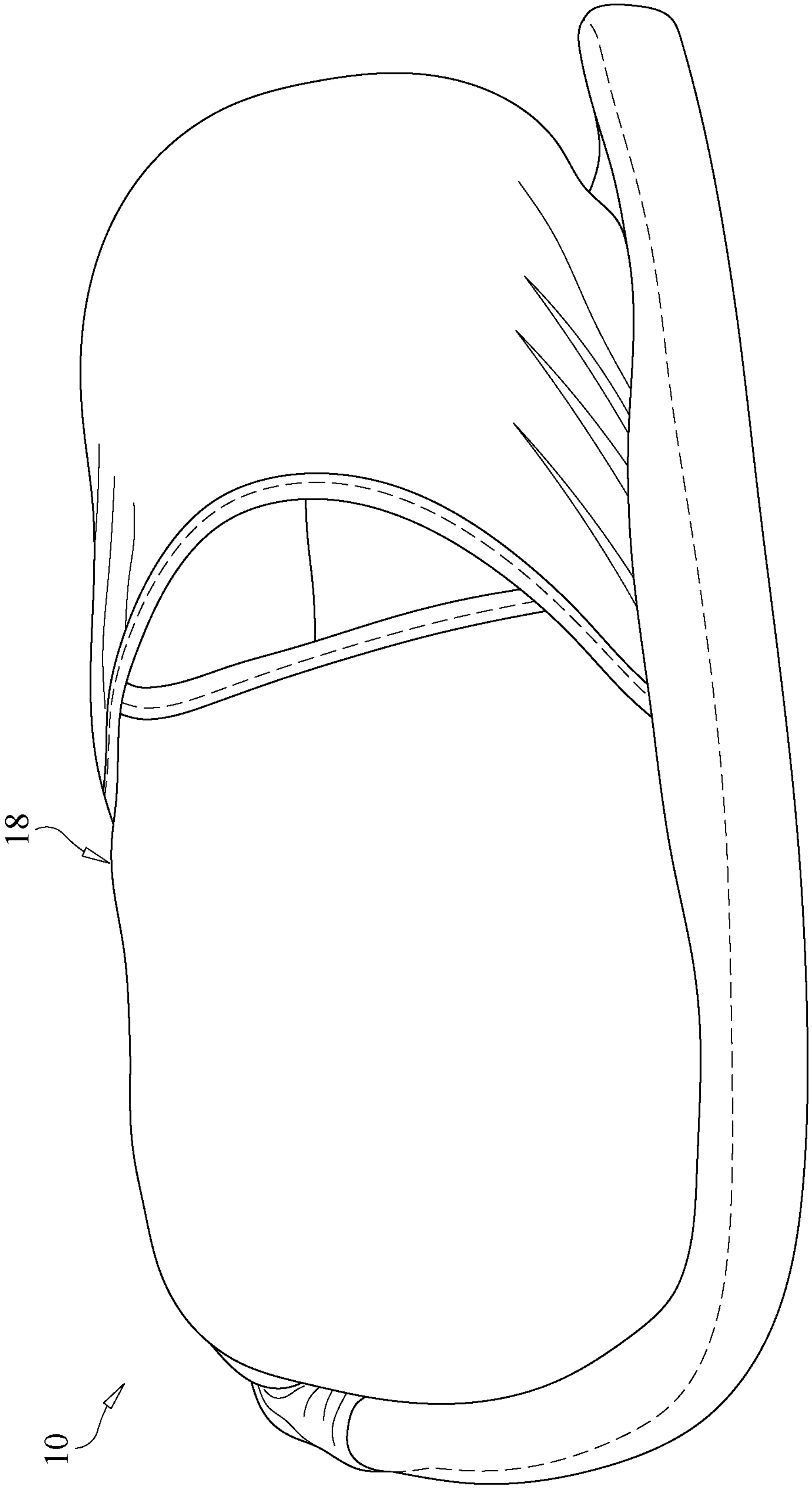
FIG. 16 illustrates a first (normal) rolled-up configuration wherein the front side is exposed providing maximum exterior cushion.
Figure 17:
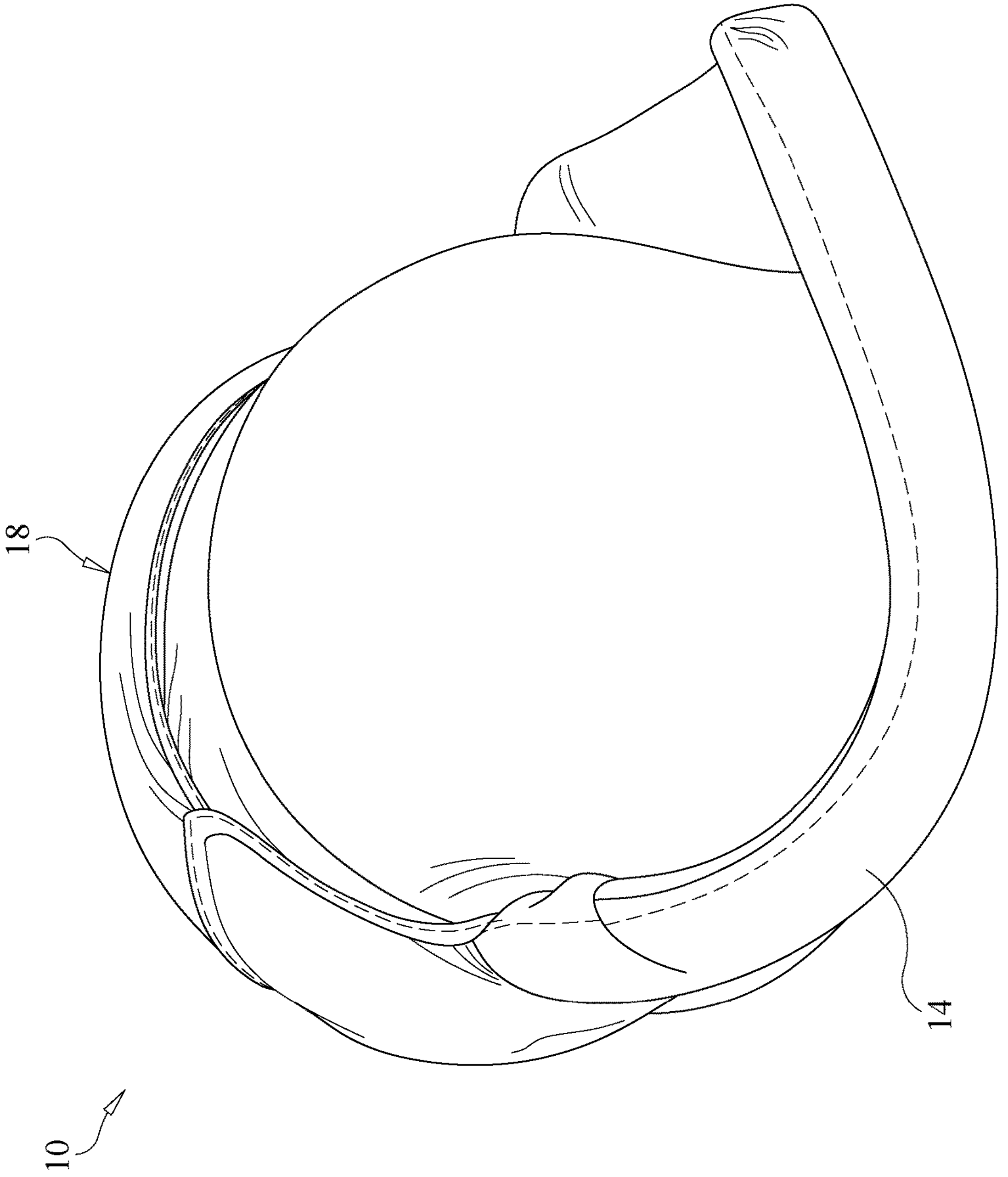
FIG. 17 is a side view thereof.
Figure 18:
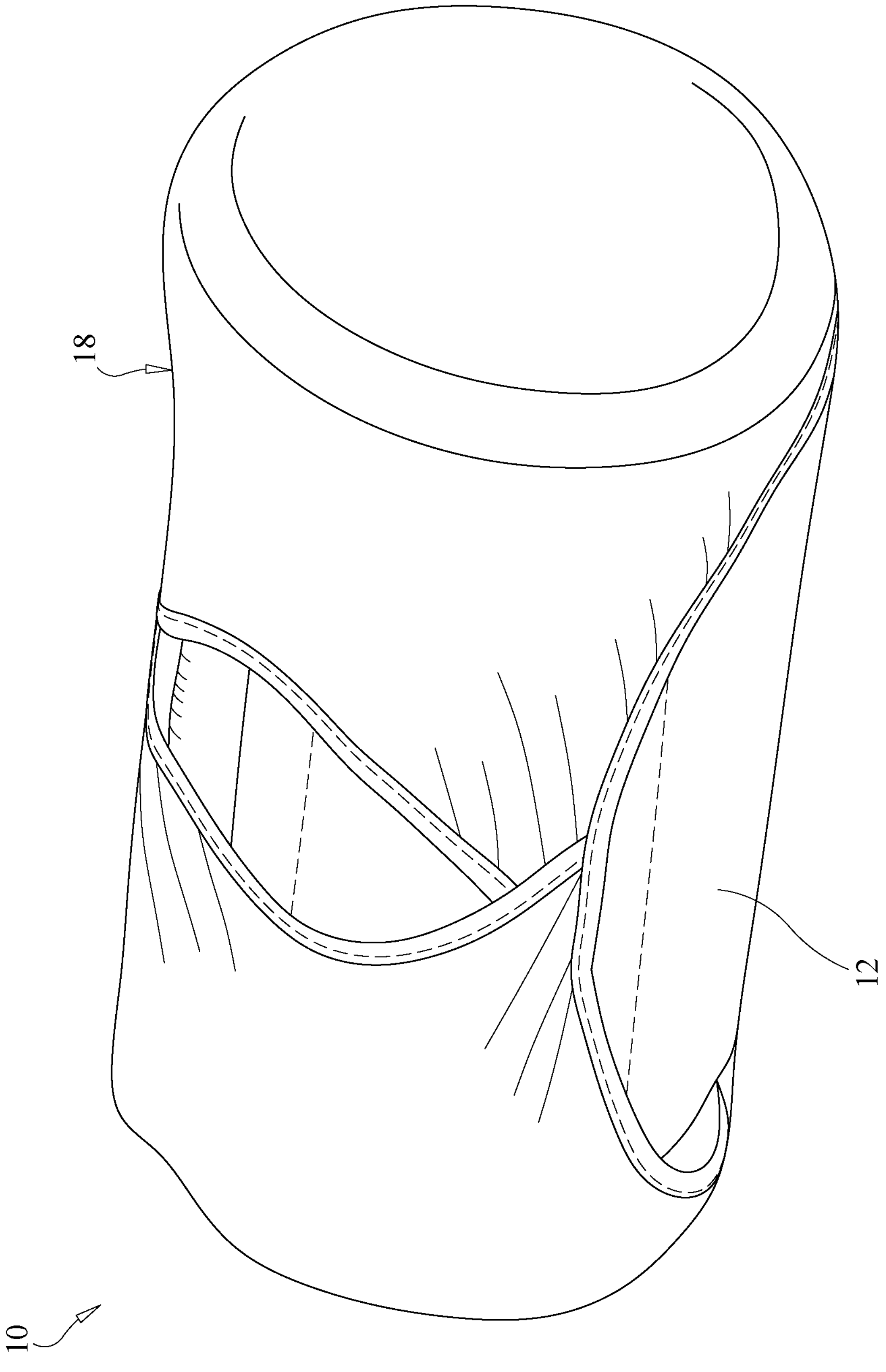
FIG. 18 illustrates a second (inside out) compact rolled-up configuration wherein the rear non-slip side is exposed and the front side is protected from exposure to dirt and debris.
Figure 19:
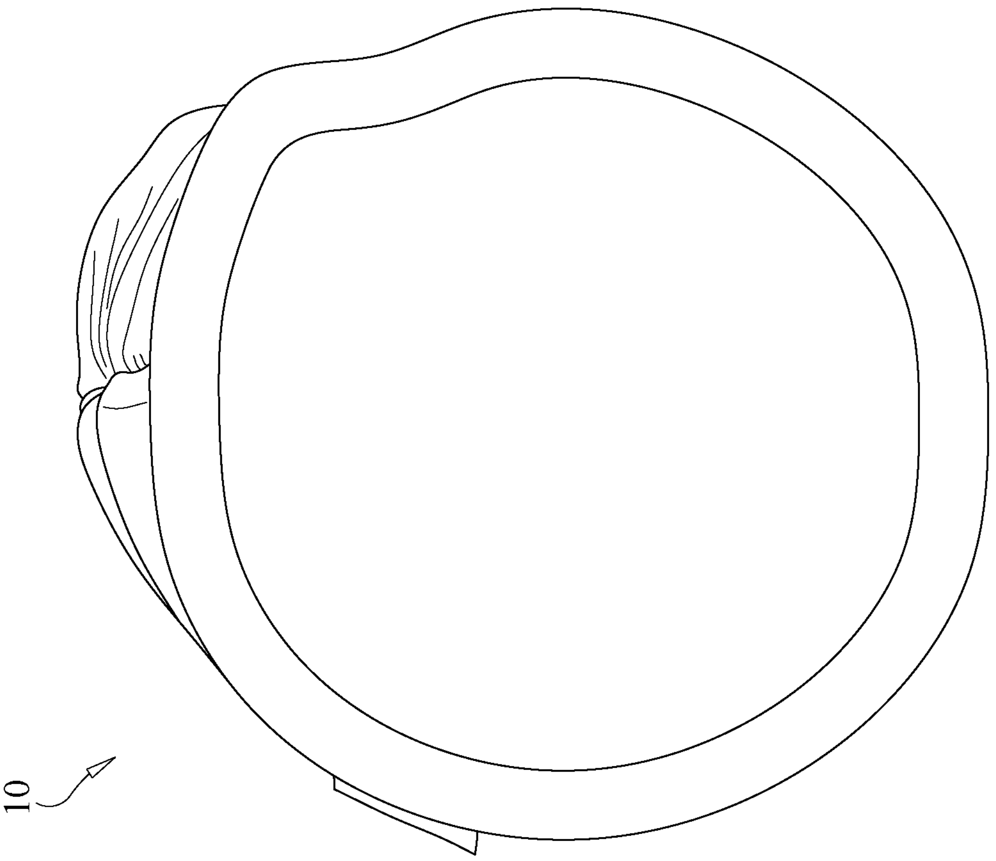
FIG. 19 is a side view thereof.

FIGS. 15-19, illustrate use of the cover pocket to maintain the travel mat 10 in one of its alternate first and second rolled-up configurations. With reference to FIGS. 16-19, the first and second rolled up configurations are depicted. FIGS. 16 and 17 illustrate a first (normal) rolled-up configuration wherein the front side is exposed providing maximum exterior cushion. This configuration is best suited when using travel mat 10 as a pillow. FIGS. 18 and 19 illustrates a second (inside out) compact rolled-up configuration wherein the rear non-slip side is exposed and the front side is protected from exposure to dirt and debris. This configuration is best suited when transporting the travel mat as the "cushion" side, which normally contacts the user when in use, is contained within the interior of the rolled structure and thus protected from exposure to dirt and debris.

Figure 4:
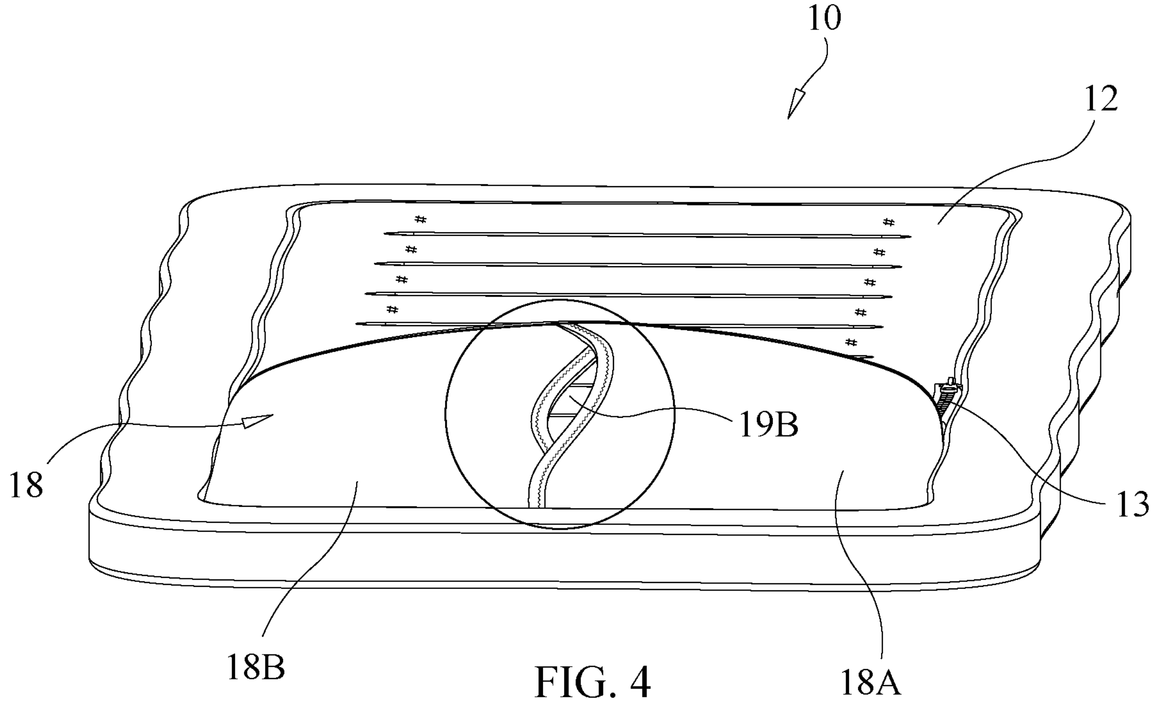
FIG. 4 is a top perspective view thereof.
Figure 4A:
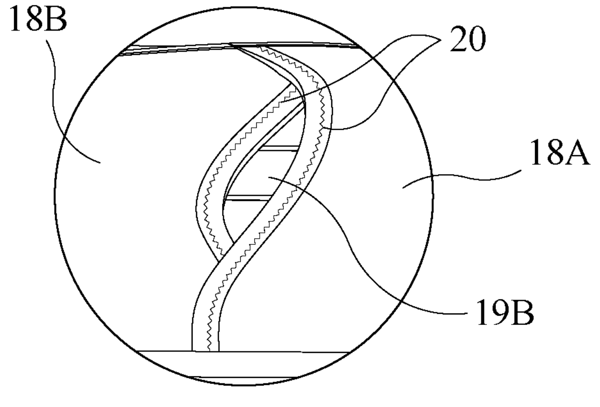
FIG. 4A is a partial detail view of the encircled area in FIG. 4.
Figure 14:
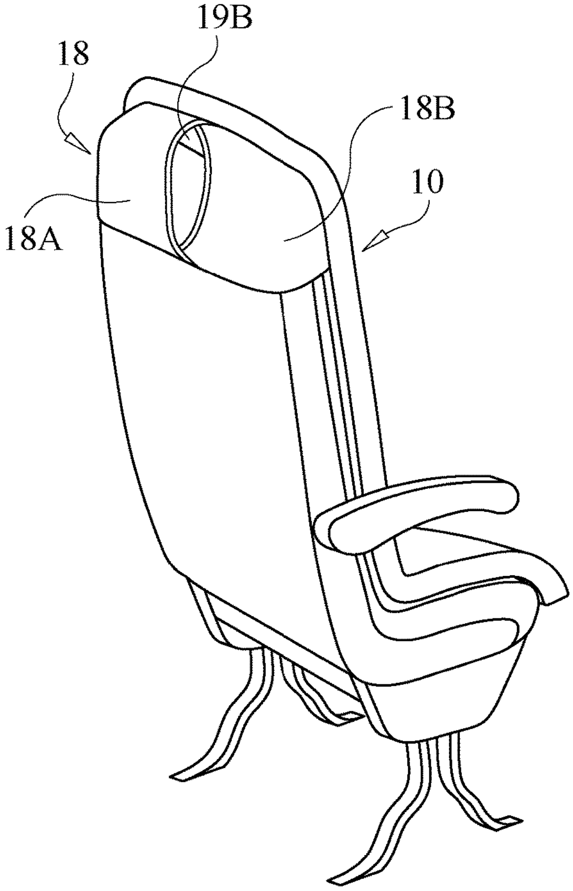
FIG. 14 depicts the portable travel mat installed on an aircraft chair.
Figure 20:
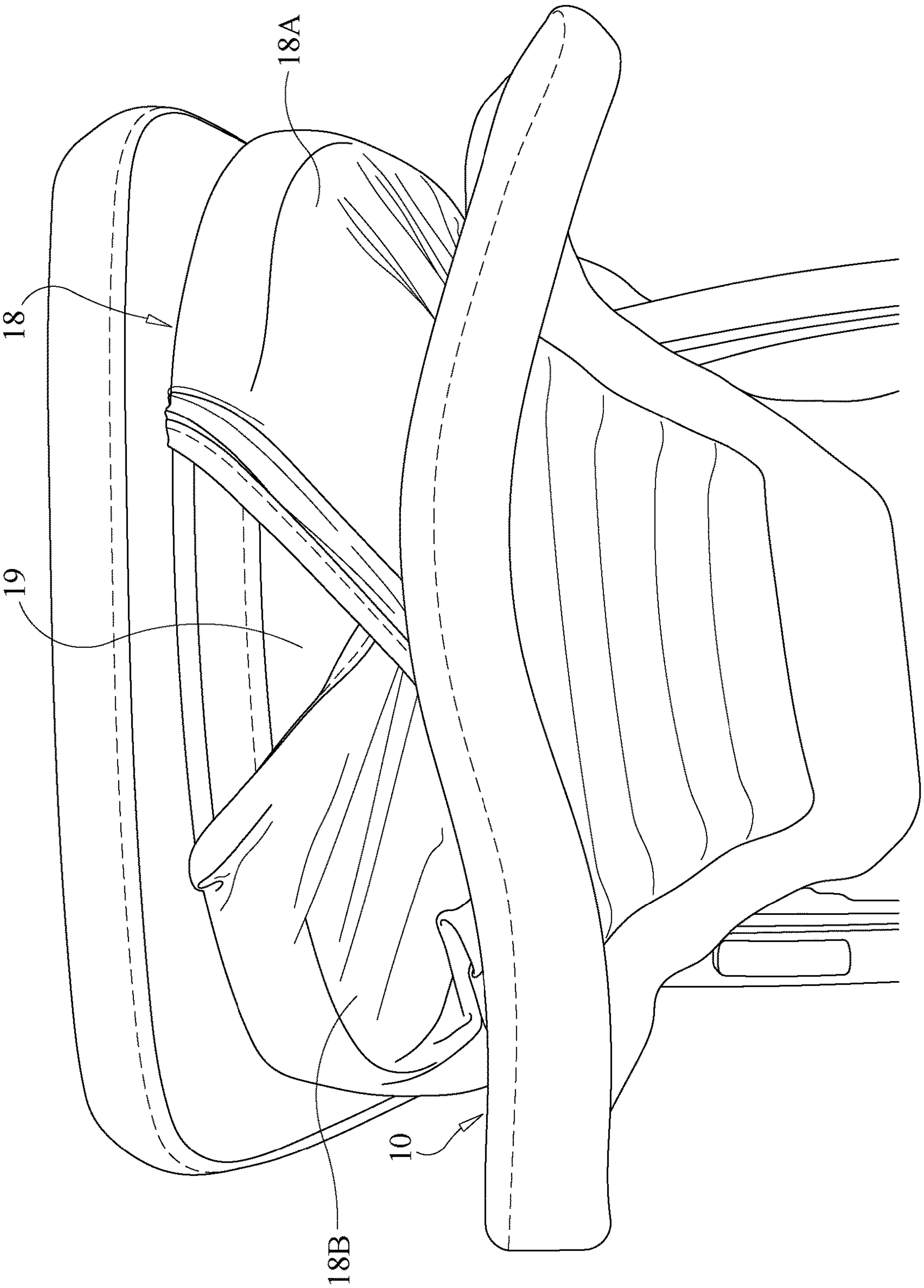
FIG. 20 illustrates the portable travel mat secured by the cover pocket on the headrest of an airline seat.

Cover pocket 18 is preferably comprised of overlapping fabric sections, referenced as 18A and 18B which are configured to define a primary opening 19A, and a smaller, generally centrally disposed secondary opening 19B. In addition, primary opening 19A may be stretched over the travel mat when in a rolled-up configuration to maintain the travel mat securely rolled up. It should be noted that in alternate embodiments cover pocket may be formed of a single piece of sufficiently stretchable material having a central secondary opening. Secondary opening 19B enables the travel mat to be affixed to rolling luggage by insertion of the luggage handle as seen in FIG. 15. Secondary opening 19B is also very handy for the user to put his hand or arm through for portability or for attaching the travel mattress to something. The peripheral edges of pocket sections 18A and 18B are adapted and finished with elastic stitching 20, as illustrated in FIG. 4A that allows the pocket to stretch and expand. Cover pocket 18 may also receive the top of a chair as shown in FIG. 14 or any other supporting structure. A significant advantage of cover pocket 18 is its ability to secure the travel mat to the head rest of an airline seat as illustrated in FIG. 20 such that the back of the chair, which usually includes a video screen used by the passenger behind, is not obstructed.

Figure 5:
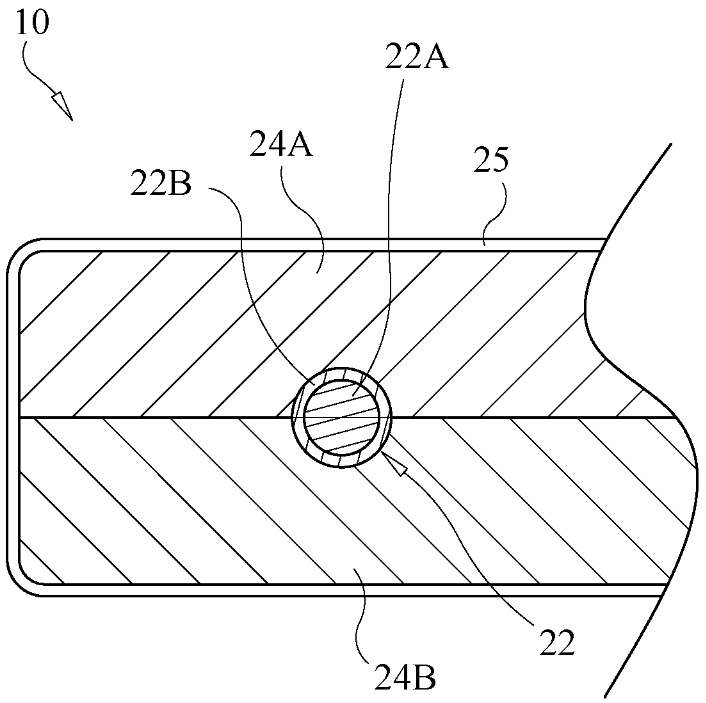
FIG. 5 is a partial sectional view of a peripheral edge of the portable travel mat detailing the bendable cable embedded therein.

The peripheral edge 16 of travel mat 10 contains a firm, but bendable metal rod or cable, generally referenced as 22 that allows the entire periphery of travel mat 10 to be manually manipulated into a variety of different shapes, for user comfort. Bendable cable 22 is shown in broken/hidden line in FIGS. 1 and 2. FIG. 5 provides a partial detailed sectional view of bendable cable 22. In a preferred embodiment bendable cable 22 comprises an insulated electrical conductor cable having a metal core 22A surrounded by a plastic sheath 22B that can be manually bent, to provide various different configurations that change the shapes of the travel mattress such as folded over sections, rolled up segments, all for providing comfort in a chair or seat. Bendable cable 22 is sandwiched between first and second layers of foam material, referenced as 24A and 24B, and the entire travel mat is covered by a cover material 25. As should now be apparent, bendable cable 22 allows travel mat 10 to be bent into any number of a variety of shapes depending on the need for comfort while seated or resting in a somewhat uncomfortable device or area. The firm but bendable metal cable or rod can be formed by a suitable gage of electrical cable joined at the ends.

With polyurethane foam having a thickness of 0.8-inches (20 mm) thick periphery of the travel mattress that contain manually bendable, coated hard copper electric cable or wire that can be 2 mm in diameter, however, any suitable material and dimensions is considered within the scope of the present invention. Bendable cable 22 is flexible with impact strength to prevent any contact between a user and the bendable cable used to maintain each configuration in the shape of the travel mattress when in use.

Figure 6:
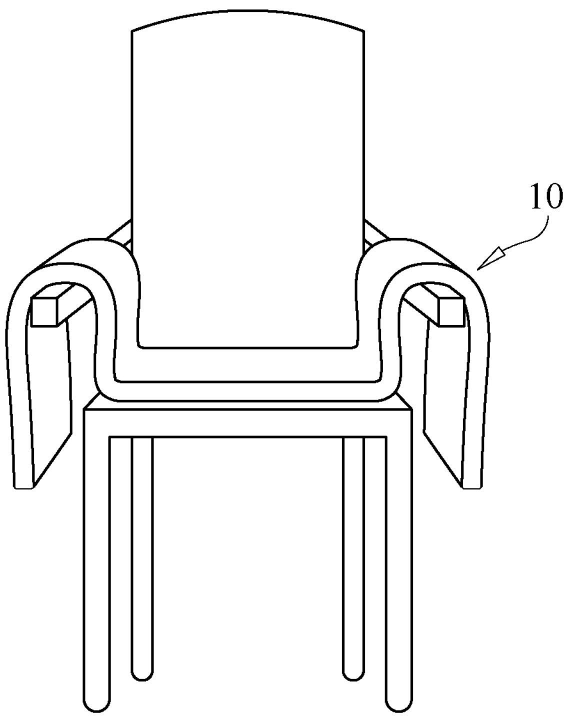
FIGS. 6-11 depict the portable travel mat in various configurations on a chair.
Figure 7:
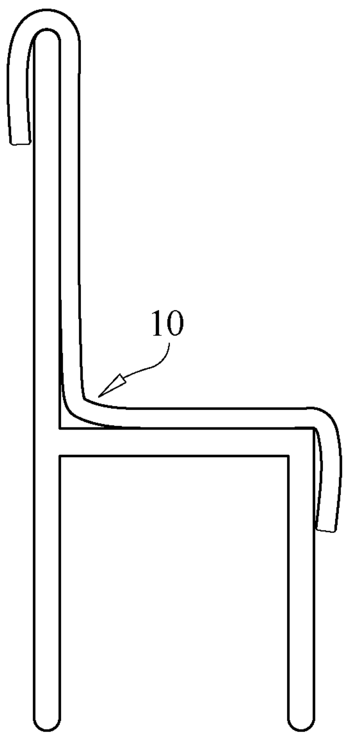
Figure 8:
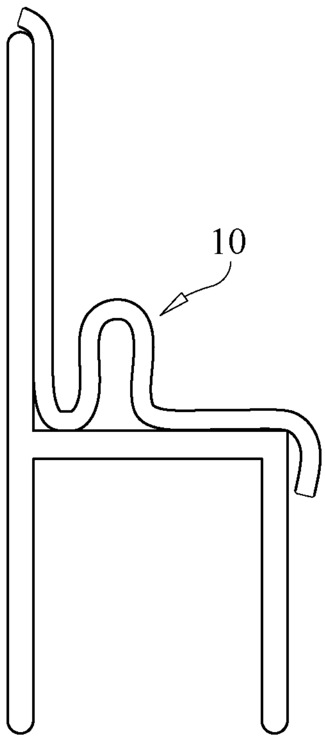
Figure 9:
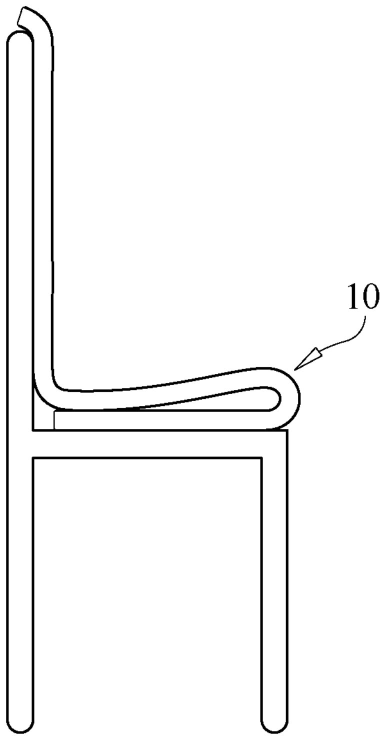
Figure 10:
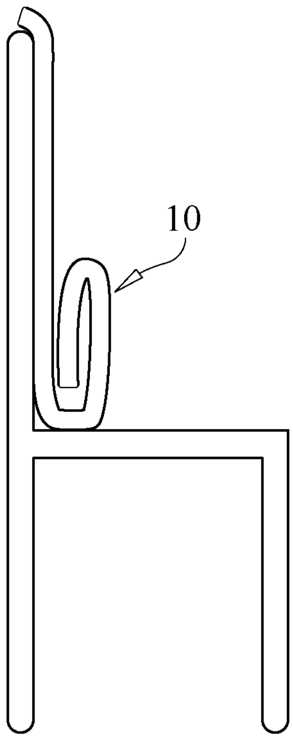
Figure 11:
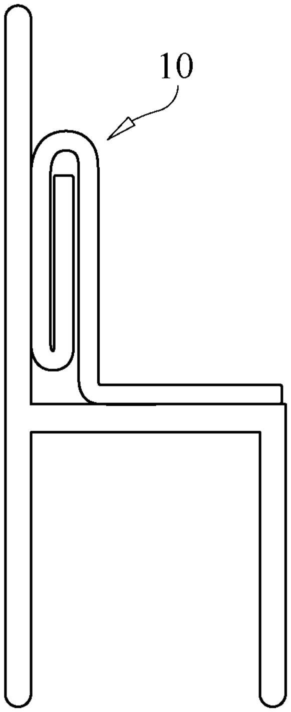
Figure 12:
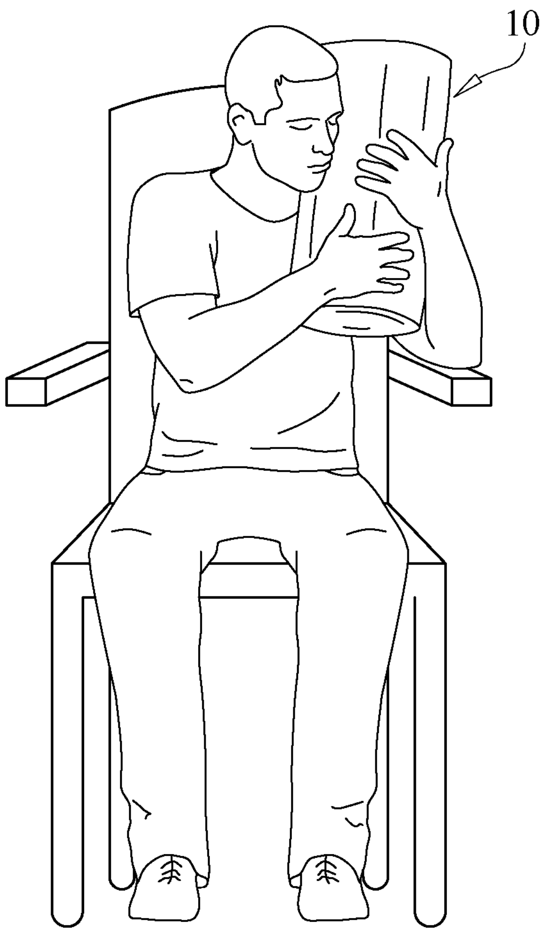
FIG. 12 depicts the portable travel mat configured for use as a pillow.
Figure 13:
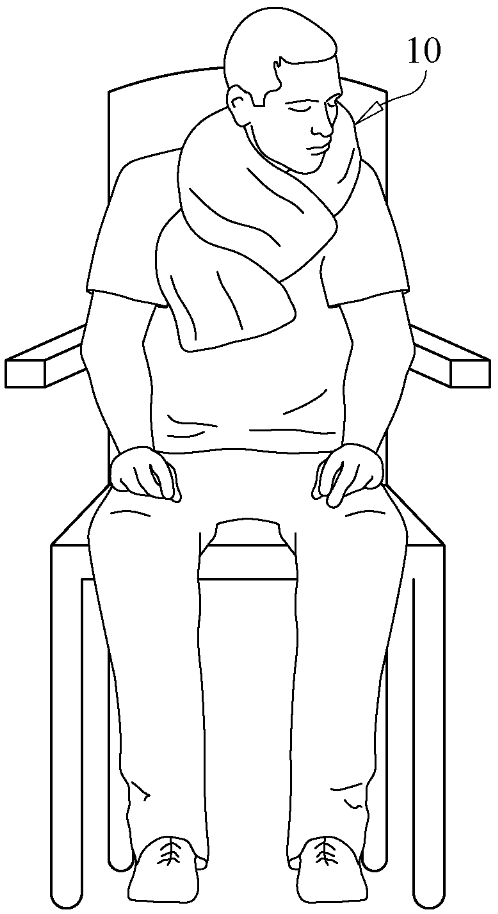
FIG. 13 depicts the portable travel mat configured as a neck pillow.

FIGS. 6-11 provide examples of some of the configurations and shapes that travel mat 10 may be manipulated into by the user. As should be apparent, bendable cable 22 functions to maintain travel mat 10 in the user selected shape/configuration. FIG. 6 shows the travel mat 10 folded over the seat and arm rests of a chair. FIG. 7 shows travel mat 10 folded over the top of the chair backrest and seat. The upper portion may be secured to the chair by bending the upper portion into a J-shaped whereby bendable cable 22 maintains the top portion hooked over the chair as shown, however, the travel mat may also be secured by inserting the top of the chair into the primary opening 19A of cover pocket 18 as illustrated in FIG. 14. FIG. 8 shows travel mat 10 placed over the seat and backrest of the chair and also including additional folds for lower back support. FIG. 9 shows travel mat 10 placed over the seat and backrest of the chair and folded to provide extra seat cushioning. FIG. 10 shows travel mat 10 placed over the backrest of the chair and folded to provide 3 layers of lower back support. FIG. 11 shows travel mat 10 placed over the seat and lower portion of the backrest to provide seat cushioning and 3 layers of back support. FIGS. 12 and 13 illustrate configuration of travel mat 10 as a pillow (FIG. 12) and a neck pillow (FIG. 13). As discussed above, FIG. 14 shows travel mat 10 affixed to a chair by expanding cover pocket 18 with the aid of elastic stitching 20 such that cover pocket 18 is disposed in covering relation with the top of the chair. FIG. 15 illustrates travel mat 10 is a fully rolled up configuration wherein the mat is substantially received within cover pocket 18 and wherein travel mat 10 is affixed to an article of rolling luggage by insertion of the luggage handle through primary and secondary openings 19A and 19B.

The travel mattress invention herein, with its firm but bendable, peripheral, metal cable, surrounded by two layers of foam, in a travel mat peripheral fabric cylindrical member, in multiple configurations, has been displayed in its desirable operating environment. Certainly other configurations are available that would also be useful for providing comfort to a user, especially when traveling.

The instant invention has been shown and described herein in what is considered to be the most practical and preferred embodiment, and alternate embodiments. It is recognized, however, that departures may be made therefrom within the scope of the invention and obvious modifications will occur to a person skilled in the art.

What is claimed is:

1. A portable travel mat that can be manually configured into multiple configurations, said portable travel mat comprising:

a mat body including a front side and a rear side;

a peripheral edge disposed in surrounding relation with said mat body and including two layers of foam and a bendable cable disposed between said two layers of foam, said peripheral edge enclosed with cover material;

whereby the travel mat is configured to be manually shaped in multiple configurations by bending said bendable cable positioned inside the peripheral edge;

a stretchable cover pocket affixed to the rear side of said mat body;

said cover pocket defining a primary opening sized and configured to receive the mat body when the mat body is in the rolled storage configuration such that the primary opening elastically stretches around the rolled mat body to retain the mat body in the rolled storage configuration, and a secondary opening spaced inward from opposing peripheral side edge portions of said cover pocket.

2. The portable travel mat of claim 1 wherein said cover pocket includes first and second overlapping fabric sections configured to define the primary opening and the secondary opening.

3. The portable travel mat of claim 2 wherein said cover pocket includes peripheral edges finished with elastic stitching thereby rendering said cover pocket as elastically expandable.

4. A portable travel mat that can be manually configured into multiple configurations, said portable travel mat comprising:

a mat body formed of a rectangular foam pad enclosed within cover material, and including a front side and a rear side;

a peripheral edge connected to, and in surrounding relation with, said foam pad, said peripheral edge including two layers of foam and a bendable cable disposed between said two layers of foam, said peripheral edge enclosed with cover material;

a stretchable cover pocket affixed to the rear side of said mat body;

said cover pocket includes first and second overlapping fabric sections configured to define a primary opening and a secondary opening disposed between a first portion of said peripheral edge and an opposing second portion of said peripheral edge;

said cover pocket includes peripheral edge finished with elastic stitching thereby rendering said cover pocket as elastically expandable;

whereby the travel mat is configured to be manually shaped in multiple configurations by bending said bendable cable positioned inside the peripheral edge along four sides of the portable travel mat.

5. The travel mat of claim 4 wherein the rear side of said main body is covered by anti-slip material.

* * * * *